United States Patent [19]

Morisawa

[11] 4,355,877
[45] Oct. 26, 1982

[54] MECHANISM FOR COUNTING FILM FRAMES IN CAMERA WITH MULTIPLE EXPOSURE MODE

[75] Inventor: Tahei Morisawa, Matsudo, Japan

[73] Assignee: Asahi Kogaku Kogyo Kabushiki Kaisha, Tokyo, Japan

[21] Appl. No.: 233,233

[22] Filed: Feb. 10, 1981

[30] Foreign Application Priority Data

Feb. 20, 1980 [JP] Japan ................................ 55-20312

[51] Int. Cl.³ .............................................. G03B 17/36
[52] U.S. Cl. ...................................... 354/217; 354/289
[58] Field of Search ........................ 354/217, 218, 289

[56] References Cited

U.S. PATENT DOCUMENTS

| 3,829,876 | 8/1974 | Uno et al. | 354/217 |
| 4,021,828 | 5/1977 | Iura et al. | 354/289 |
| 4,191,463 | 3/1980 | Urano et al. | 354/217 |
| 4,247,189 | 1/1981 | Date et al. | 354/289 |

FOREIGN PATENT DOCUMENTS

| 2521158 | 11/1976 | Fed. Rep. of Germany | 354/217 |
| 54-111334 | 8/1979 | Japan | 354/217 |

Primary Examiner—Russell E. Adams
Attorney, Agent, or Firm—Sughrue, Mion, Zinn, Macpeak & Seas

[57] ABSTRACT

A camera mechanism for counting film frames in a camera capable of operating in both normal and multiple exposure modes. A shutter charging mechanism is coupled to a winding lever mechanism so as to be charged for each operation of the winding lever. A film winding mechanism is coupled through a gear structure which includes a ratchet and pawl arrangement wherein the film winding mechanism is engaged with the winding lever mechanism for a multiple exposure position of a multiple exposure operating member and disengaged therefrom for a normal position of the multiple exposure operating member. A first switch is actuated for each operation of the winding lever while a second switch is operatively coupled to the multiple exposure operating member. A counting circuit counts the number of times the first switch is operated except when inhibited by the second switch when the multiple exposure operating member is in the multiple exposure position.

11 Claims, 15 Drawing Figures

FIG. 5
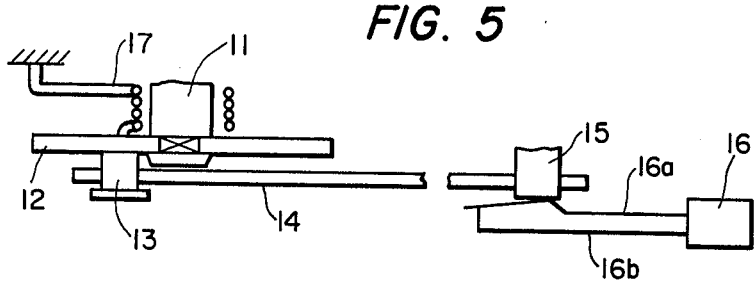
FIG. 6
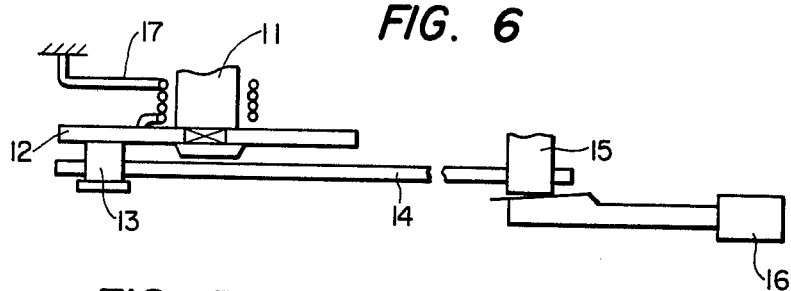
FIG. 7         FIG. 8
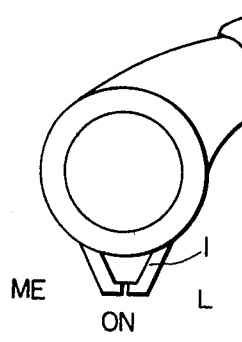   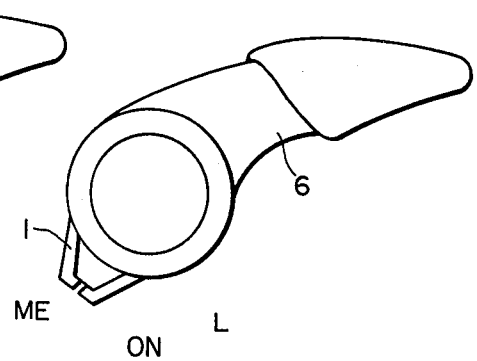
FIG. 9
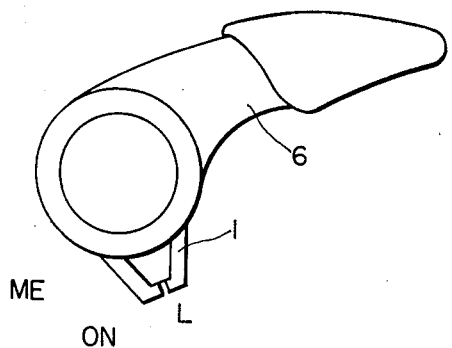

MECHANISM FOR COUNTING FILM FRAMES IN CAMERA WITH MULTIPLE EXPOSURE MODE

BACKGROUND OF THE INVENTION

The present invention relates to a mechanism for electrically counting and displaying film frame numbers representing the number of frames of a film which have been wound in a camera, specifically, for a multiple exposure operating mode. This type of mechanism is hereinafter referred to as "a film winding frame-number counting mechanism" when applicable.

Recently, electronic techniques have been increasingly employed in cameras. In recently developed cameras, data set by the photographer and data calculated photometrically by the circuitry of the camera is displayed, for instance, with LED's in the viewfinder and also displayed with display elements on the outside of the camera. In such a camera, various types of data can be separately displayed on one display element.

In a conventional film winding frame-number counting mechanism, the number of frames is counted by mechanically moving or turning a dial for indicating the number of frames referred to as "a frame-number dial". A gear is coupled to the dial which is advanced by an angle corresponding to one tooth of the gear for each winding operation. Since this counting mechanism requires a large number of components, the reliability of the mechanism is less than desired.

On the other hand, in an electrical film winding frame-number counting mechanism, a switch for counting the number of frames, referred to as "a frame-number switch", is disposed in the operation range of a member which performs a single operation such as one reciprocation or one revolution for every winding operation to thus provide detection signal which is used to count the number of frames. A switch otherwise provided in the camera can be used for this purpose such as a timing switch for the shutter time setting circuit or a winding completion switch used for an electromagnetic release operation. In a camera operating in a multiple exposure mode, the film is not fed between exposures so that the frame number should not be advanced.

SUMMARY OF THE INVENTION

In view of the foregoing, in a film winding frame-number counting mechanism according to the invention, a multiple switch is provided which operates in association with a multiple exposure operating member. When the multiple switch has been switched, the number of frames is not advanced even if a signal representing film winding is provided by a frame-number switch.

More specifically, the invention provides a camera mechanism for counting film frames in a camera capable of operating in either a normal mode in which the film frame count is advanced by one count for each winding operation or in a multiple exposure mode in which the shutter of the camera is energized but the film is not wound and hence the film frame count not advanced. This mechanism includes winding lever means, film advancing means, shutter charging means which is operatively coupled to be actuated by operation of the winding lever means, multiple exposure operating means, means for engaging the winding lever means with the film advancing means for a first position of the multiple exposure operating means and disengaging the winding lever means from the film advancing means for a second position of the multiple exposure operating means, means for counting pulses representing a number of film frames, and means for inhibiting the counting means for the second position of the multiple exposure operating means.

The counting means includes a first switch operatively positioned to be actuated in response to movement of the winding lever means for each operation of the winding lever independent whether the normal or multiple exposure mode is selected. The inhibiting means is preferably a second switch mechanically coupled to the multiple exposure operating means and electrically coupled to the counting means for inhibiting operation of the counting means in the second position of the multiple exposure operating means. The engaging and disengaging means, in the preferred embodiment, is a first gear coupled to be rotated by the winding lever means and further includes ratchet and pawl means positioned to be operated by the multiple exposure operating means for coupling and uncoupling the first gear to the winding lever means in response to operation of the multiple exposure operating means wherein the first gear is uncoupled from the winding lever means in the multiple exposure mode position of the multiple exposure operating means.

BRIEF DESCRIPTION OF THE DRAWINGS

FIG. 5 is a side view of a frame-number switch which is closed at the middle stage of a winding operation;

FIG. 6 is a side view of the frame-number switch showing it maintained closed at the final stage of a winding operation;

FIGS. 7 through 9 are top views of the multiple exposure operating number 1 showing various operational positions thereof;

DESCRIPTION OF THE PREFERRED EMBODIMENTS

A preferred embodiment of the invention will be described with reference to the accompanying drawings.

Figure 1:
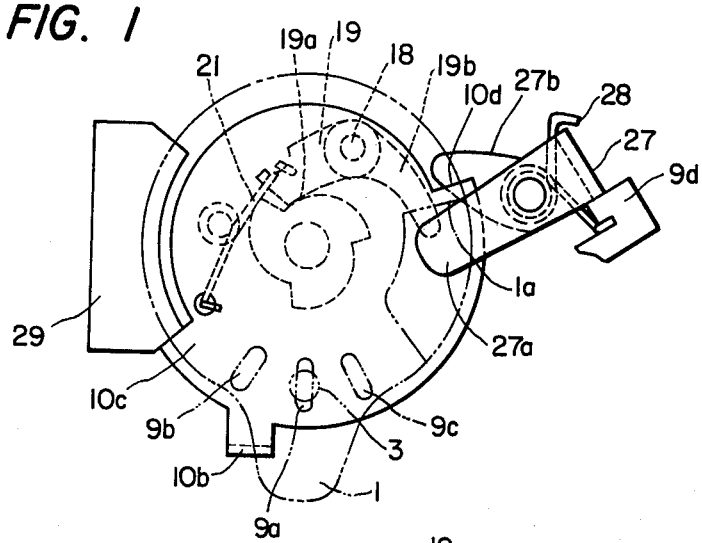
FIG. 1 is a top view of a multiple exposure operating member, a multiple lever and a ratchet pawl in a normal state.
Figure 2:
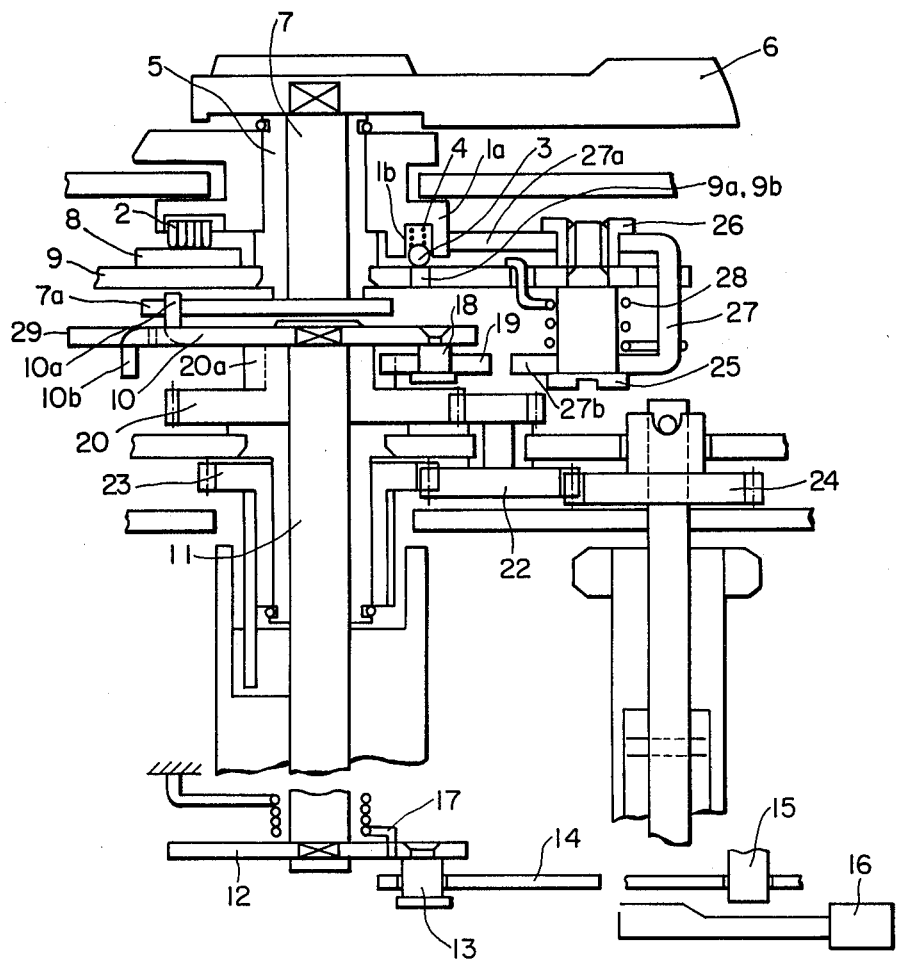
FIG. 2 is a side view, partly as a sectional view, of a winding mechanism of the invention.

FIG. 1 is a top view of a multiple exposure operating member and a film winding mechanism. FIG. 2 is a sectional view of the multiple exposure operating member, the film winding mechanism and a shutter winding mechanism.

The multiple exposure operating member 1 is rotatably mounted on a bearing 5 which is rigidly coupled to a winding seat plate 9. The multiple exposure operating member 1 has a hole 1b formed therein into which a steel ball 3 and a coil spring 4 are inserted with the ball 3 exerting a pressure on the winding seat plate 9. The winding seat plate 9 has holes 9a, 9b and 9c at predetermined angular positions with which corresponding predetermined angles of rotation of the multiple exposure operating member 1 are detected.

A winding lever 6 is fixedly secured to the bearing 5 and a winding drive lever 7 is rotatably provided in the bearing 5. A cam plate 10 is provided below the winding drive lever 7. The cam plate 10 has an upwardly bent portion 10a which is engaged with a lever handle portion 7a of the winding driving lever 7. A winding shaft 11 is fixed to the cam plate 10 at the center of rotation. A charge plate 12 is secured to the lower end of the winding shaft 11. A charge pin 13 is secured to the charge plate 12 away from the center of rotation of the charge plate 12. The charge pin 13 extends into a hole in one end portion of a charge link 14, the other end of which is coupled to a shutter charge pin 15. A switch 16 for detecting the number of frames, hereinafter referred to as "a frame-number switch 16", is disposed in the operating range of the shutter charge pin 15. A return spring 17 is coupled to the winding shaft 11, which is rigid with the cam plate 10 and the charge plate 12, so as to urge the winding shaft 11 in a direction opposite to the winding direction.

A ratchet pawl shaft 18 extends from a portion of the cam plate 10 away from the center of rotation thereof. A ratchet pawl 19 is rotatably mounted on the shaft 18. A ratchet spring 21 is provided which urges the end portion 19a of the ratchet pawl 19 against the ratchet wheel 20a of a first gear 20 which is mounted coaxially on the winding shaft 11. That is, the ratchet pawl 19 is engaged with the ratchet wheel 20a of the first gear 20. The first gear 20 is engaged with an intermediate gear 22 which is engaged with both a spool gear 23 and a sprocket gear 24. The cam plate 10 is provided with protrusions 10c and 10d wherein, after the cam plate 10 is turned through a predetermined angle, the cam plate 10 is stopped and then it is turned in the opposite direction, or restored, to be stopped again. A stop plate 29 is provided at the same level as the cam plate 10 so as to abut the protrusions 10c and 10d.

Further, a multiple lever 27 is coupled to a multiple lever shaft 25 and a nut 26 with the multiple lever 27 mounted over the winding seat plate 9. The multiple lever 27 is U-shaped and has an upper portion 27a at the same level as the wall portion of the multiple exposure operating member 1 and a lower portion 27b at the same level as the ratchet pawl 19 and the downwardly bent portion 10b of the cam plate 10. A return spring 28 is coupled to the lever 27 which urges the lever 27 to turn clockwise. The rotation of the lever 27 is stopped by a stop portion 9d of the winding seat plate 9.

Figure 10:
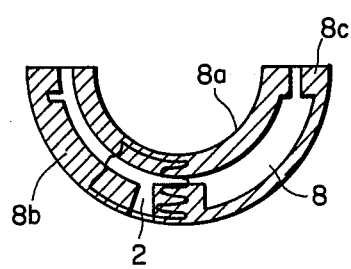
FIGS. 10 through 12 are top views of a multiple exposure switching substrate and a brush operating in association with the multiple exposure operating member showing various positions of the brush with respect to the multiple exposure switching substrate.
Figure 11:
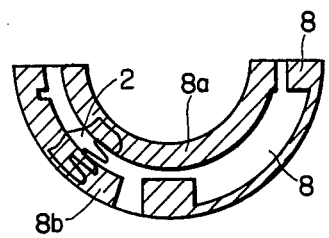
Figure 12:
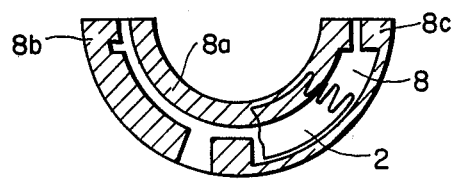

As shown in FIGS. 10, 11 and 12, three lands 8a, 8b and 8c are printed on a multiple exposure switching substrate 8. A contact brush 2 is fixedly secured to the multiple exposure operating member 1 through an electrical insulator. The brush 2 is arranged to slide on the substrate 8. When the position of the multiple exposure operating member 1 is as shown in FIG. 7, the position of the brush 2 is as indicated in FIG. 10, when the position of the operating member 1 is as shown in FIG. 8, the position of the brush 2 is as indicated in FIG. 11, and when the position of the operating member 1 is as shown in FIG. 9, the position of the brush 2 is as indicated in FIG. 12. More specifically, when the multiple exposure operating member 1 is set to a mark "ON", the land 8a on the multiple exposure switching substrate 8 is electrically connected to the land 8c and the land 8a is electrically disconnected from the land 8b. When the operating member 1 is set to a mark "ME", the lands 8a and 8b are electrically connected to each other and the lands 8a and 8c are electrically disconnected from each other. When the operating member 1 points to a mark "L", the lands 8a, 8b and 8c are all electrically disconnected from one another.

Figure 13:
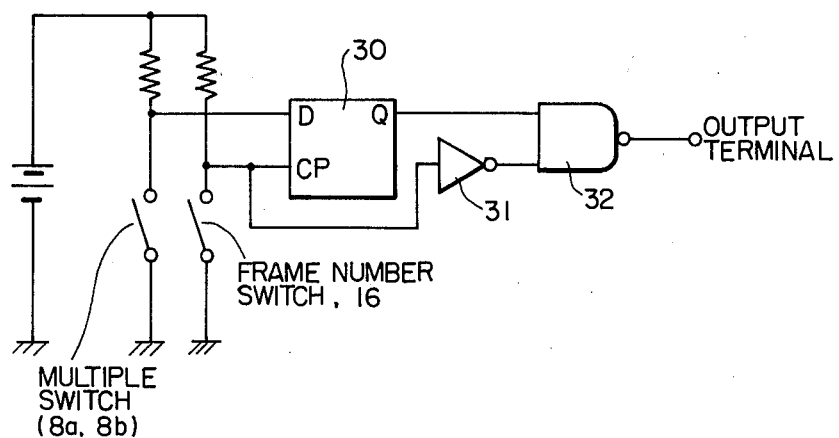
FIG. 13 is a schematic diagram showing a film winding frame-number counting circuit according to the invention.

A circuit for counting the number of frames according to the invention, hereinafter referred to as "a frame-number counting circuit", is arranged as shown in FIG. 13. More specifically, the frame-number counting circuit, as shown in FIG. 13, includes a D type flip-flop circuit 30 whose state is changed with a fall of its input signal, an inverter 31 and a NAND gate 32. When the frame-number switch 16 is closed and a multiple switch formed by lands 8a and 8b is open, a count signal is provided at the output terminal as shown in the timing diagram of FIG. 14. However, when the frame-number switch 16 is closed with the multiple switch formed by lands 8a and 8b closed, no count signal is provided at the output terminal.

As, in the normal condition, the winding lever 6 is turned so that the upwardly bent portion 10a of the cam plate 10 is charged in the direction of rotation by the lever handle portion 7a of the winding driving lever 7 which is coupled directly to the winding lever 6. That is, the cam plate 10 is turned in synchronization with the winding lever 6. Accordingly, the charge plate 12 is also turned by the winding shaft 11 while the charge pin 13 on the charge plate 12 is arcuately turned around the winding shaft 11. The arcuate motion of the charge pin 13 is transmitted through the charge link 14 to the shutter charge pin 15 to move the pin 15 straightly. The shutter charge pin 15 is so positioned with respect to the frame-number switch 16 that the switch 16 is open before the winding operation is carried out as shown in FIG. 2. As the winding lever 6 is turned, the frame-number switch 16 is closed during the turning operation as shown in FIG. 5. The switch 16 is maintained closed until the winding operation is ended, i.e. the protrusion 10d of the cam plate 10 abuts against the stop plate 29, which is the state shown in FIG. 6.

On the other hand, while winding the film, the wheel 20a of the first gear 20 is turned by the ratchet pawl 19 secured to the cam plate 10 thereby to turn the spool gear 23 and the sprocket gear 24 through the gear 23. If after the winding lever has been turned through the predetermined angle, it is turned in the opposite direction, the ratchet pawl 19 together with the cam plate 10 is retracted with the first gear 20, and the intermediate gear 22, the spool gear 23 and the sprocket gear 24 are maintained stopped.

With respect to the film winding frame-number count, when the multiple exposure operating member 1 is set to point to the mark "ON" as shown in FIG. 7, the positional relation between the brush 2 and the multiple exposure switching substrate 8 is as shown in FIG. 10.

Figure 14:
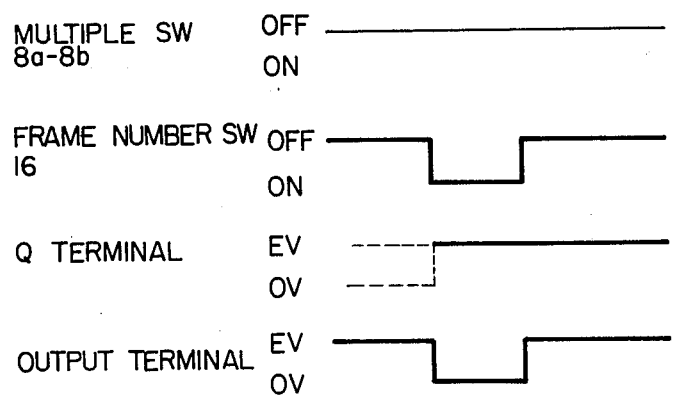
FIG. 14 is a timing chart for a description of an operation of the counting mechanism of the invention in which the number of frames is counted under ordinary conditions.

That is, the multiple switch made up of the lands 8a and 8b is open. Therefore, if the frame-number switch 16 is closed during the winding operation, the count signal as shown in FIG. 14 is provided at the output terminal of the circuit in FIG. 13.

Figure 3:
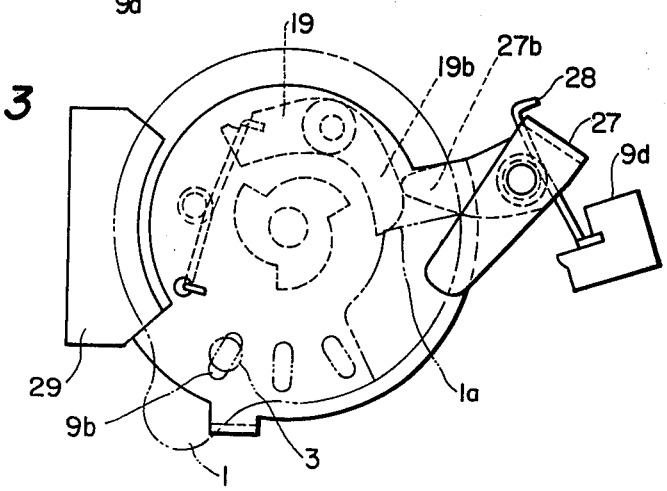
FIG. 3 is a top view of the components in FIG. 1 before a winding operation is effected with the charging of a film winding system released in performing a multiple exposure operation.
Figure 4:
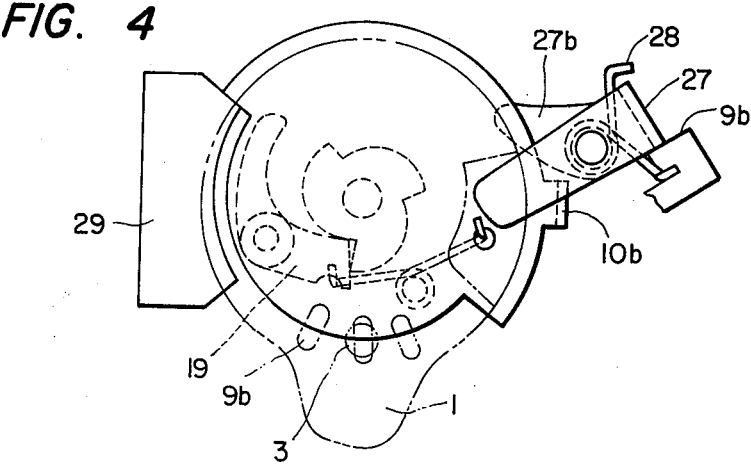
FIG. 4 is a top view of the components in FIG. 1 illustrating a state in which the multiple lever is restored at the final stage of a winding operation.
Figure 15:
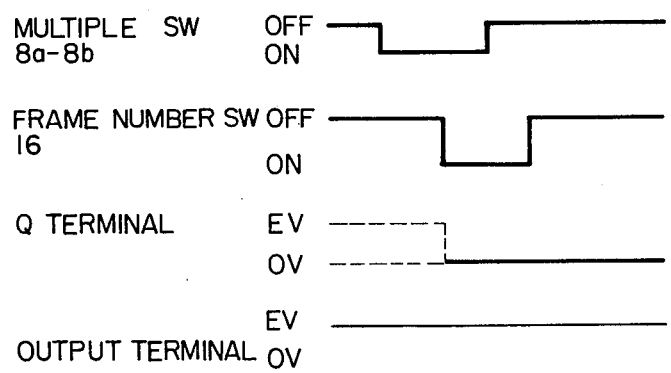
FIG. 15 is a timing chart for a description of an operation in which the number of frames is not counted in a multiple exposure mode.

When the multiple exposure operating member 1 is set to point to the mark "ME" as shown in FIG. 8, the brush 2 is positioned as shown in FIG. 11 so that the multiple switch formed by the lands 8a and 8b is closed. In this case, the multiple lever 27 is turned counterclockwise against the elastic force of the return spring 28 by the wall 1a of the multiple exposure operating member 1 as shown in FIG. 3 as a result of which a tail portion 19b of the ratchet pawl 19 is pushed inwardly by the lower portion 27b of the multiple lever 27. Then, the steel ball 3 is in the hole 9b in the winding seat plate 9 with the ratchet pawl 19 removed from the ratchet wheel 20a of the first gear 20 thus stopping the multiple exposure operating member 1. As the winding lever 6 is turned, the cam plate 10 is turned in synchronization therewith. As the final stage of this winding operation, the downwardly bent portion 10b of the cam plate 10 abuts against the lower portion 27b of the multiple lever 27 to return the lever 27 to the position shown in FIG. 4. Accordingly, the steel ball 3 is moved from the hole 9b back to the hole 9a while the multiple exposure operating member 1 is returned to its original position as shown in FIG. 4. In this operation, the multiple switch corresponding to the lands 8a and 8b formed between the brush 2 and the multiple exposure switching substrate 8 is switched at the final stage of the winding operation. That is, the time instant when the "closed" state of the multiple switch is changed to the "open" stage is made to occur later than the time instant when the "open" stage of the frame-number switch is changed to the "closed" state at the middle stage of the winding operation so that no film winding frame-number is counted. The timing relation between these operations is indicated in FIG. 15. The proper timing relation can be provided by suitably adjusting the position of the frame-number switch 16.

With the film winding frame-number counting mechanism of the invention constructed as described above, in an ordinary winding operation, that is, a winding operation not in the multiple exposure mode, the number of frames of film wound is counted by the frame-number switch. On the other hand, in the multiple exposure mode, the film feeding system is maintained disengaged by the multiple exposure operating member while the multiple switch operating in association therewith is switched so that the frame-number switch is switched before the multiple frame operating member returns at the final stage of the winding operation thereby to prevent the film winding frame-number counting operation.

The above-described two switches may be replaced by switches which are provided in a camera to perform other functions. For instance, the frame-number switch may be replaced by the timing switch for the shutter speed setting circuit. As described above, the multiple switch is made up of a brush operating in association with the multiple exposure operating member and the multiple exposure switching substrate with the lands as shown in FIGS. 10 through 12. The lands 8a and 8b may be used as the power switch. In this case, when the multiple exposure operating member is set as shown in FIG. 7, the brush is positioned as shown in FIG. 10 so that the power switch is turned on, and when the operating member is set as shown in FIG. 9, the brush is positioned as shown in FIG. 12 so that the power switch is turned off. Thus, the multiple switch can be used as the power switch for the camera. As the frame-number switch can be used commonly as the timing switch, it is unnecessary to additionally provide these switches which results in the provision of a camera in which the number of components is reduced. Hence, a reliable film winding frame-number counting mechanism is provided according to the invention.

What is claimed is:

1. A camera mechanism for counting film frames in a camera having normal and multiple exposure modes, comprising: winding lever means; film winding means; shutter charging means, said shutter charging means being operatively coupled to be actuated by operation of said winding lever means; multiple exposure operating means; means for engaging said winding lever means with said film winding means for a first position of said multiple exposure operating means and disengaging said winding lever means from said film winding means for a second position of said multiple exposure operating means; a first switch operatively positioned to be actuated in response to movement of said winding lever means for counting pulses representing a number of wound film frames; and a second switch mechanically coupled to said multiple exposure operating means and electrically coupled to said counting means for inhibiting operation of said counting means for said second position of said multiple exposure operating means.

2. A camera mechanism from counting film frames in a camera having normal and multiple exposure modes, comprising: winding lever means; film winding means; shutter charging means, said shutter charging means being operatively coupled to be actuated by operation of said winding lever means; multiple exposure operating means; means for engaging said winding lever means with said film winding means for a first position of said multiple exposure operating means and disengaging said winding lever means from said film winding means for a second position of said multiple exposure operating means, said engaging and disengaging means comprising a first gear coupled to be rotated by said winding lever means and ratchet and pawl means positioned to be operated by said multiple exposure operating means for coupling and uncoupling said first gear to said winding lever means in response to said multiple exposure operating means; means for counting pulses representing a number of wound film frames; and means for inhibiting said counting means for said second position of said multiple exposure operating means.

3. A camera mechanism for counting film frames in a camera having normal and multiple exposure modes comprising: a winding lever; a winding drive lever rigidly coupled to said winding lever and being mounted to rotate in response to movement of said winding lever; a rotatably mounted winding shaft; a cam plate rigidly coupled to an upper end of said winding shaft, said cam plate having upper and lower bent portions, an end of said lower portion of said winding drive lever being positioned to abut said upper bent portion of said cam plate; a charge plate rigidly coupled to a lower end of said winding shaft; a charge pin coupled to said charge plate at a position thereof away from the axis of rotation of said charge plate; a charge link, said charge pin being disposed in a hole in a first end of said charge link; a shutter charge pin coupled to a second end of said charge link; a frame-number switch positioned to be actuated by movement of said shutter charge pin; a multiple exposure operating member coaxially mounted around a portion of said winding drive lever; a winding seat plate disposed between a lower portion of said winding drive lever and said multiple exposure operating member; a U-shaped multiple lever rotatably mounted on a portion of said winding seat plate away from the axis of rotation of said winding drive lever and said multiple exposure operating member, an upper end of said multiple lever being positioned to engage said multiple exposure operating member; a first gear rotatably mounted on said winding shaft, said first gear having an upper ratchet wheel portion and a lower gear portion; a ratchet pawl shaft mounted on said cam plate; a ratchet pawl rotatably mounted on said ratchet pawl shaft, one end of said ratchet pawl being disposed to engage and disengage said ratchet wheel portion of said first gear and a second end of said ratchet pawl being engagable by a lower end of said multiple lever; a film winding mechanism coupled to be operated in response to rotation of said first gear; a multiple exposure switch substrate mounted on said winding seat plate, said multiple exposure switch substrate having a plurality of conductive lands formed thereon; a contact brush having a lower conductive portion slidable upon said multiple exposure switch substrate, said contact brush being mechanically coupled to be moved by said multiple exposure operating member; counting circuit means for counting a number of operations of said frame-number switch, lands of said multiple exposure switch substrate being coupled to said counting circuit means for inhibiting the counting operation of said counting circuit means when said multiple exposure operating member is in a multiple exposure mode position.

4. The camera mechanism of claim 3 wherein said downwardly bent portion of said cam plate is disposed to engage with said lower portion of said multiple lever to return said multiple lever from said multiple exposure mode position to a normal position at the completion of a film winding operation of said winding lever.

5. The camera mechanism of claim 4 further comprising a multiple lever shaft for rotatably mounting said multiple lever on said winding seat plate and a return spring positioned around a portion of said multiple lever shaft for urging said multiple lever towards its position corresponding to said normal position of said multiple exposure operating member.

6. The camera mechanism of claim 4 wherein said winding seat plate is provided with a plurality of holes therein and wherein said multiple exposure operating member has a hollow portion formed therein and further comprising a ball at least partially positioned in said hollow portion in said multiple exposure operating member and a spring urging said ball towards said winding seat plate, said ball being engagable in said holes formed in said winding seat plate.

7. The mechanism of claim 4 wherein said counting circuit means comprises a D type flip-flop, an inverter and a NAND gate, said frame number switch having a first terminal coupled to a clock input of said flip-flop and a second terminal coupled to a ground terminal of a power source, said clock terminal of said flip-flop being coupled to an input of said inverter and an output of said inverter being coupled to a first input of said NAND gate, said multiple exposure switch substrate having a first land coupled to said around terminal of said power source and a second land coupled to a D input of said flip-flop, said first and second lands being shaped and positioned with respect to said contact brush such that said first and second lands are disconnected from one another in said normal position of said multiple exposure operating member and said first and second lands are connected together in said multiple exposure mode position of said multiple exposure operating member, an output of said flip-flop being coupled to a second input of said NAND gate.

8. The camera mechanism of claim 7 wherein said frame-number switch is positioned so that its switching time instant occurs earlier than the switching time of a switch formed by said first and second lands and said contact brush.

9. The camera mechanism of claim 4 further comprising a return spring operatively coupled to said charge plate for urging said charge plate and said winding shaft to a position corresponding to a normal position of said winding lever.

10. The camera mechanism of claim 4 wherein said film winding mechanism comprises an intermediate gear engaged with said first gear and a sprocket gear engaged with said intermediate gear.

11. The camera mechanism of claim 4 wherein said ratchet pawl is shaped and positioned so as to be disengaged from said ratchet wheel portion of said first gear by said lower portion of said multiple lever when said multiple exposure member is in said multiple exposure mode position.

* * * * *